Dec. 31, 1929.  W. I. FERGUSON  1,741,455
WATER HEATING APPARATUS
Filed Aug. 19, 1926   3 Sheets-Sheet 1
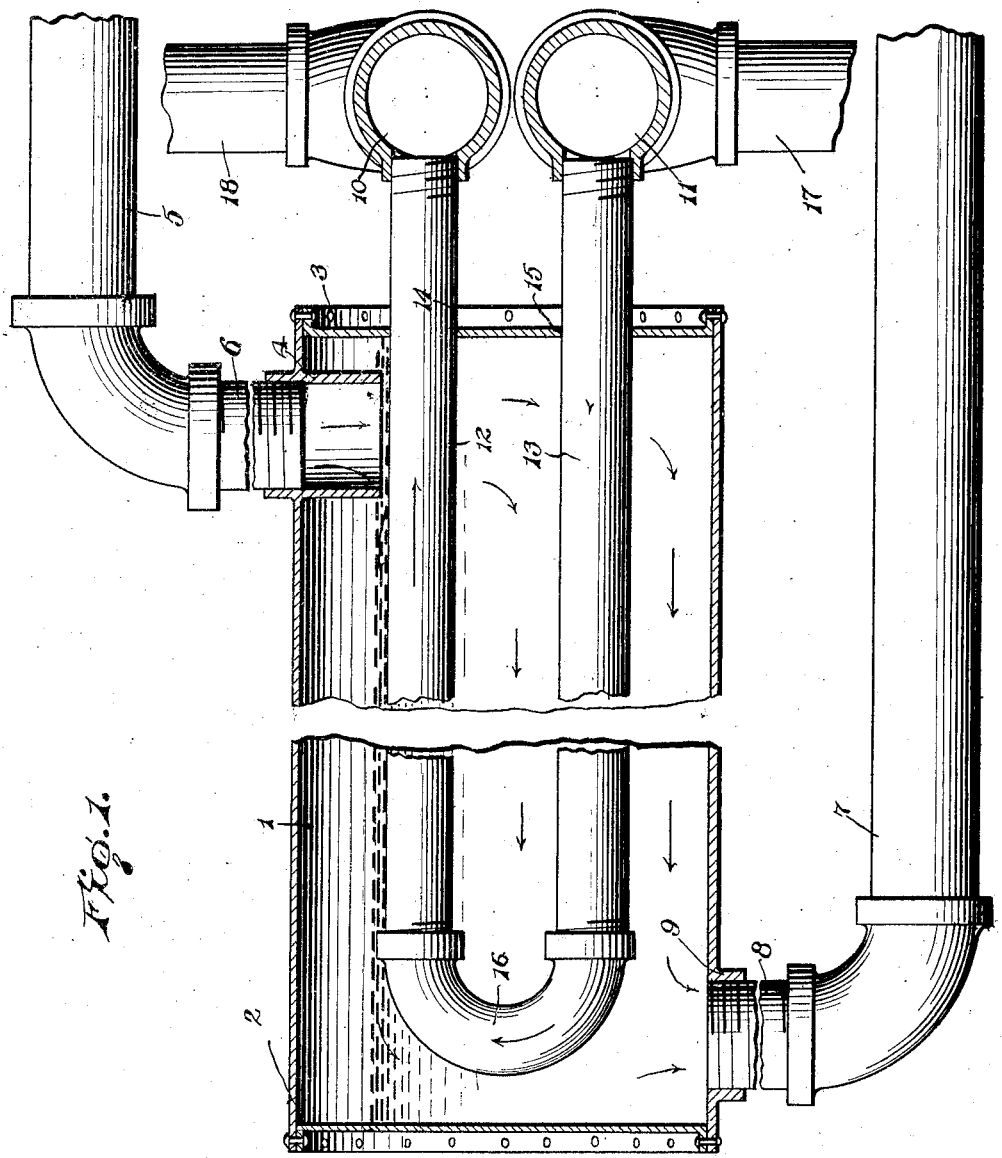

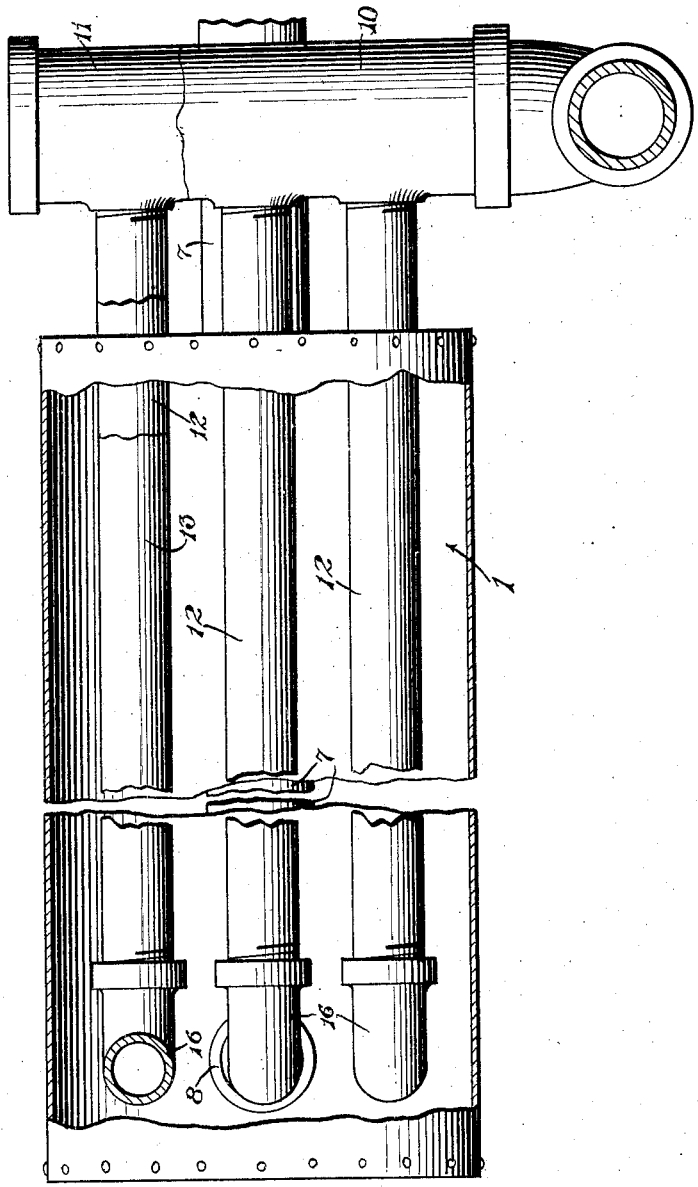

Dec. 31, 1929.  W. I. FERGUSON  1,741,455
WATER HEATING APPARATUS
Filed Aug. 19, 1926  3 Sheets-Sheet 3
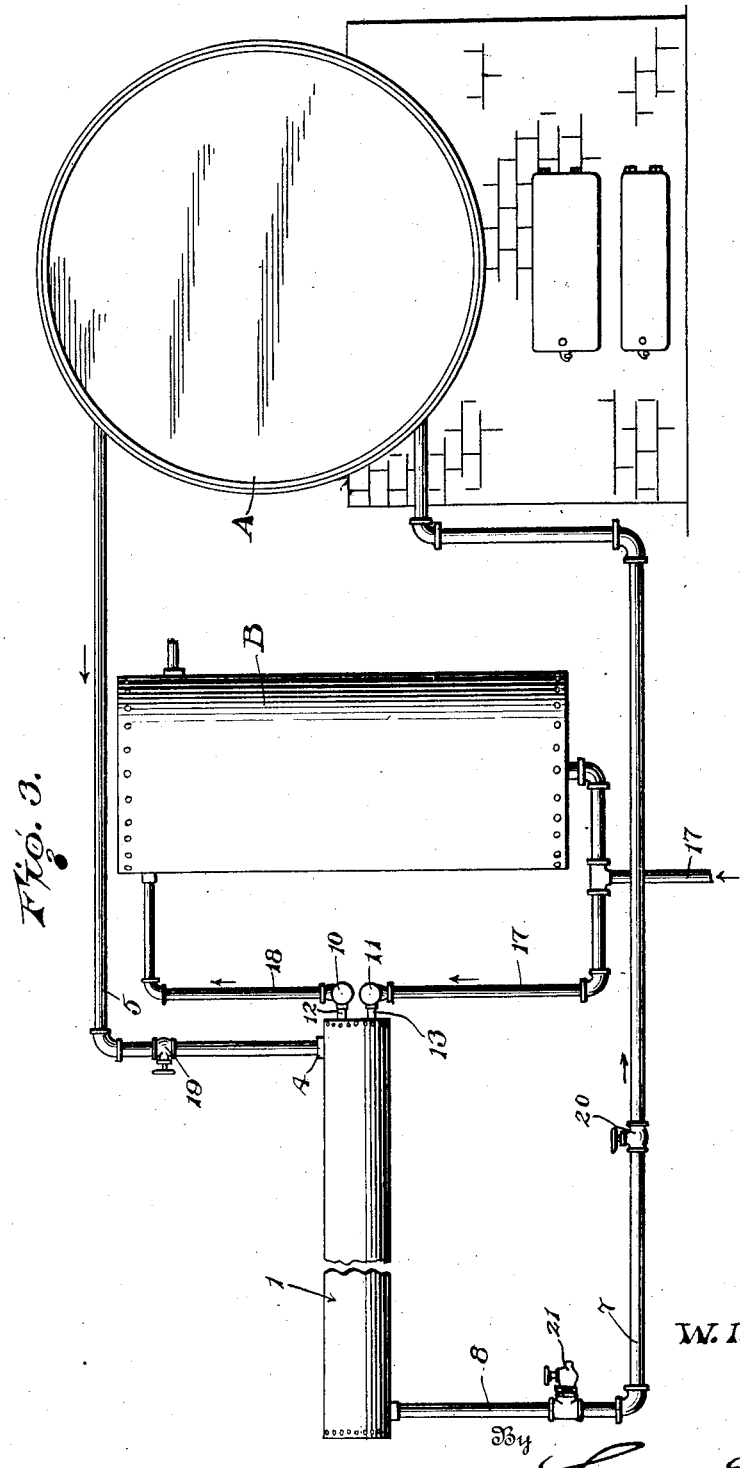
Inventor
W. I. Ferguson,
By
Lacy & Lacy, Attorneys Patented Dec. 31, 1929

1,741,455

UNITED STATES PATENT OFFICE

WILLIAM IRWIN FERGUSON, OF CHICAGO, ILLINOIS

WATER-HEATING APPARATUS

Application filed August 19, 1926. Serial No. 130,239.

This invention relates to water heating apparatus and has as its general object to provide an apparatus adapted to be installed in connection with a boiler or heating plant which in itself is designed solely for heating purposes, thereby obviating the necessity of employing a separate heating plant for producing hot water for use by the occupants of hotels, apartment houses, hospitals, office buildings, and private homes, and likewise effecting a saving in consumption of fuel.

Another object of the invention is to provide water heating apparatus so constructed that when installed in connection with a heating plant such as referred to above, it will operate automatically to maintain a constant supply of hot water.

Another object of the invention is to so construct the apparatus that the water may be heated thereby without the disagreeable and constant knocking in the pipes which is caused by the sudden condensation of steam and the expansion and contraction which attends the use of ordinary water heaters, the apparatus embodying the invention operating in an entirely noiseless manner and with maximum efficiency.

In the accompanying drawings:

Figure 1 is a vertical longitudinal sectional view through the apparatus embodying the invention.

Figure 2 is a plan view of the apparatus, parts being broken away and parts being shown in section to better illustrate the invention.

Figure 3 is a view in elevation of the heating apparatus installed in connection with a heating plant and a hot water storage tank.

In the drawings, the numeral 1 indicates a circulating drum or shell which is of heavy sheet metal and preferably of cylindrical form and is closed at its ends by heads 2 and 3, the said drum being horizontally disposed as shown in Figure 1 of the drawings. A fitting 4 is welded in an opening in the upper side of the drum 1 near the head 3 thereof, and a pipe 5 has one of its ends connected to the fitting, as for example by a nipple 6. This pipe leads from the boiler shell of the heating plant, indicated by the reference character A, and from a point within the boiler slightly below the normal water level therein, so that the pipe is adapted to conduct hot water from the boiler to the drum. By reference to Figure 1, it will be observed that the fitting 4 extends downwardly into the drum an appreciable distance below the upper side of the wall of the drum, so that a predetermined water level will be maintained within the drum thus providing an air space in the upper portion of the drum and in this manner providing against the creation of knocking noises in the operation of the apparatus. A pipe 7 is connected in any suitable manner, as for example by a nipple 8, with a fitting 9 preferably welded in an opening in the wall of the drum at the lower side thereof and preferably adjacent the head 2, and this pipe 7 leads to the boiler of the heating plant and communicates therewith at the low point of the said boiler. Therefore, when the heating plant is in operation, there will be a constant circulation of hot water from the boiler of the heating plant, through the drum 1, and back to the boiler.

In the drawings, the numeral 10 indicates an outlet manifold for the water heated by the apparatus and the numeral 11 an intake or supply manifold through which the water to be heated is delivered. These manifolds are of cylindrical form and are arranged opposite the head 3 of the drum 1, the manifold 10 being arranged above the manifold 11. A plurality of water tubes 12 and 13 are connected at their ends with the manifolds 10 and 11 respectively and are extended through and welded in openings 14 and 15 respectively formed in the head 3 of the drum 1. Respective ones of the pipes 12 and 13 are connected at their ends which extend into the drum, by elbows 16 or the pipes may be integral and provided with stems, as found expedient. The water tubes 12 and 13 may be of any desired number and in the illustrated embodiment of the invention there are three sets of these tubes the tubes 12 being arranged in a horizontal series in a plane immediately below the lower end of the fitting 4 so that while they are at all times submerged in the water in the drum 1, they are immediately beneath the surface and are, therefore, directly in the path of the hot water which enters the drum through the pipe 5. The tubes 13 are positioned beneath their respective tubes 12 in a horizontal series and are spaced above the bottom of the drum. It will likewise be observed by reference to Figure 1 of the drawings that the tubes 12 and 13 extend nearly the entire length of the drum. A pipe 17 is connected with the manifold 11 preferably at one end of the said manifold and this pipe leads from the lower part of a hot water storage tank B, shown in Figure 3, which may be arranged at any convenient point, and from which hot water is to be supplied to the hot water fixtures throughout the building in which the apparatus is installed, this tank differing in no respect from the hot water storage tanks ordinarily employed. The pipe 17 is also placed in communication, in any suitable manner, with the water main 17', so that the supply of water is replenished as it is drawn off from the fixtures referred to above. A pipe 18 is led from one end of the manifold 10 and serves to conduct hot water from the said manifold to the upper portion of the hot water storage tank referred to above.

From the foregoing description of the invention it will be understood that there is a constant circulation from the boiler of the heating plant by way of the pipe 5 which conducts water from the boiler at the upper or hotter zone to the drum 1, where the hot water is brought into immediate contact with the circulating and heating tubes 12, the water being returned to the boiler at the lower zone thereof and that a substantially constant water level is maintained within the drum to provide an air space above the surface of the water in the drum to prevent the knocking noises ordinarily attending the operation of an apparatus of this class. It will likewise be evident that the utilization of the water delivered from the storage tank to which the pipe 18 leads from the manifold 10, effects an automatic flow of water from the manifold 11 into the tubes 13 and thence into the tubes 12, and from these tubes to the manifold 10 so that there is a constant supply of hot water available. It will likewise be evident that by the employment of the heating apparatus embodying the invention a constantly available supply of hot water is provided without the necessity of employing a separate furnace for the heating of such water, so that the expense incident to the installation of a second furnace such as is ordinarily employed, is avoided, as likewise the consumption of fuel necessary to sustain the operation of such an independent water heating plant.

Cut off valves 19 and 20 are interposed in the pipes 5 and 7 respectively and are adapted to be adjusted so as to regulate the volume of water circulating through the heating device and thus control the temperature of the water. An air inlet valve 21 is arranged in the pipe 8 between the heating device 1 and the valve 20 and, with the valve 19 closed and the valve 20 closed, the valve 21 may be opened so as to admit air into the upper portion of the heating device 1 in the event steam has condensed and the water of condensation has filled the previously present air space within the heating device, the air space being in this manner restored.

It will be evident that the heating device embodying the invention can be installed in connection with any plant now in use which has an independent water heater already installed, inasmuch as it will not interfere with the use of the independent water heater in the summer time but will save fuel and labor of firing a unit in addition to the main plant whenever the main heating plant is in operation.

Having thus described the invention, what I claim is:

In water-heating apparatus, a heating drum extending horizontally and having heads at its ends, upper and lower manifolds extending transversely of the drum externally thereof in spaced relation to the head at one end of the drum, a hot water supply pipe communicating with the upper portion of the drum, a water circulating pipe in said drum having end portions extending outwardly through upper and lower portions of the last-mentioned head and connected portions of the last-mentioned head and connected respectively with the upper and lower manifolds and communicating therewith, and an outlet pipe leading from the drum.

In testimony whereof I affix my signature.

WILLIAM IRWIN FERGUSON. [L. S.]